United States Patent
Wagner et al.

(10) Patent No.: US 11,572,440 B2
(45) Date of Patent: Feb. 7, 2023

(54) METHODS FOR PURIFYING POLYOLS CONTAINING OXYALKYLENE UNITS TO REDUCE 2-METHYL-2-PENTENAL CONTENT

(71) Applicant: Covestro LLC, Pittsburgh, PA (US)

(72) Inventors: Daniel R. Wagner, Pittsburgh, PA (US); Brian L. Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 397 days.

(21) Appl. No.: 16/793,339

(22) Filed: Feb. 18, 2020

(65) Prior Publication Data
US 2021/0253791 A1    Aug. 19, 2021

(51) Int. Cl.
  C08G 65/30   (2006.01)
  B01D 3/10    (2006.01)
  C08G 65/26   (2006.01)

(52) U.S. Cl.
  CPC ............. C08G 65/30 (2013.01); B01D 3/10 (2013.01); C08G 65/2606 (2013.01)

(58) Field of Classification Search
  CPC ... B01D 3/10; C08G 18/4829; C08G 18/4833
  See application file for complete search history.

(56) References Cited

U.S. PATENT DOCUMENTS

| | | | |
|---|---|---|---|
| 2,425,845 A | 8/1947 | Toussaint et al. | |
| 2,448,664 A | 9/1948 | Fife et al. | |
| 2,641,614 A | 6/1953 | Britton et al. | |
| 3,341,599 A | 9/1967 | Heinrirch et al. | |
| 3,715,402 A | 2/1973 | Louvar et al. | |
| 4,029,879 A | 6/1977 | Muzzio | |
| 4,110,268 A | 8/1978 | Longley et al. | |
| 4,137,396 A | 1/1979 | Louvar et al. | |
| 4,482,750 A | 11/1984 | Hetzel et al. | |
| 4,507,457 A | 3/1985 | Kohl et al. | |
| 4,535,189 A | 8/1985 | Cuscurida | |
| 4,996,310 A | 2/1991 | Acosta | |
| 5,105,019 A | 4/1992 | Gupta et al. | |
| 5,169,989 A | 12/1992 | Peterson et al. | |
| 5,468,839 A | 11/1995 | Suppes et al. | |
| 6,482,993 B1 | 11/2002 | Hofmann et al. | |
| 6,884,826 B2 | 4/2005 | Le-Khac et al. | |
| 7,005,552 B2 | 2/2006 | Kaushiva | |
| 8,501,904 B2 | 8/2013 | Lorenz et al. | |
| 8,865,945 B2 | 10/2014 | Lorenz et al. | |
| 9,284,401 B2 | 3/2016 | Lorenz et al. | |
| 9,353,039 B2 | 5/2016 | Den Heeten et al. | |
| 10,131,743 B2 * | 11/2018 | Lorenz | C08G 65/10 |
| 2017/0152354 A1 | 6/2017 | Lindner et al. | |
| 2017/0369647 A1 | 12/2017 | Caputo et al. | |
| 2019/0161577 A1 | 5/2019 | Lorenz et al. | |

FOREIGN PATENT DOCUMENTS

| | | |
|---|---|---|
| CA | 657100 A | 2/1963 |
| CA | 2023634 A1 | 2/1991 |
| CN | 101962441 A | 2/2011 |
| EP | 0038986 A2 | 11/1981 |
| GB | 958390 A | 5/1964 |

* cited by examiner

*Primary Examiner* — Pancham Bakshi
(74) *Attorney, Agent, or Firm* — Donald R. Palladino (57) ABSTRACT

Disclosed are methods for purifying polyols containing oxyalkylene units that is an alkali metal catalyzed alkoxylation reaction product of an alkylene oxide and an H-functional starter. The methods include neutralizing the alkali metal ions with an aqueous solution comprising water and sulfuric acid, in which: (i) the sulfuric acid is present in an amount of no more than 5% by weight, based on the total weight of the aqueous solution, and (ii) the sulfuric acid is used in an amount of 2% to 10% more than the theoretical amount necessary to neutralize all of the alkali metal ions present. The methods can produce polyols having a low content of 2-methyl-2-pentenal.

9 Claims, 1 Drawing Sheet

METHODS FOR PURIFYING POLYOLS CONTAINING OXYALKYLENE UNITS TO REDUCE 2-METHYL-2-PENTENAL CONTENT

FIELD

The present invention is directed to, among other things, methods for purifying polyols produced via an alkoxylation reaction using an alkali metal catalyst by neutralizing alkali metal ions in the polyol with a dilute sulfuric acid solution.

BACKGROUND

Polyether polyols are often manufactured using a catalyzed alkoxylation reaction of initiators having active hydrogen atoms with epoxides such as, for example, ethylene oxide and/or propylene oxide. Alkalinity is often introduced into the resulting polyether polyol by using alkaline metal hydroxides as catalysts.

Potassium hydroxide (KOH) and sodium hydroxide (NaOH) are some examples of typical alkaline catalysts used. In general, the metal hydroxide catalyst is added to the H-functional starter (usually a hydroxyl group containing compound), and equilibrium between the metal hydroxide and the starter occurs. This equilibrium is as shown in the following equation (using KOH as the alkaline catalyst):

$$KOH + ROH \leftrightarrow H_2O + RO^-K^+$$

Both the hydroxide and the alkoxide can react with epoxides. This is often acceptable for short chain (low molecular weight) polyols, but the reaction of water is undesirable in the preparation of long chain (i.e., high molecular weight) polyols. It is therefore, necessary to force the above equilibrium to the right by removing the water (i.e., dewatering). This converts hydroxide to alkoxide. The total amount of alkalinity remains constant and is equal to the amount of hydroxide originally added.

As polyether polyol synthesis is generally practiced, alkaline catalyst present in the polyether polyol is neutralized and/or removed prior to use of the polyol in the production of polyurethane foams. This is commonly accomplished by addition of an acid to neutralize the alkaline catalyst. This neutralization frequently results in the precipitation of a solid salt in the polyether polyol that may be removed by filtration. The removed solid is commonly called the filter cake. Traditionally, sulfuric acid has been used to neutralize polyether polyols. In order to ensure sufficient removal of the alkaline catalyst (which, if present in a sufficient amount, could undesirably catalyze a subsequent urethane-forming reaction) and to provide a filter cake that is easily handled, while still avoiding producing a polyether polyol with an undesirably high acid number (which could cause the polyether to decompose or which could also undesirably catalyze a subsequent urethane forming reaction) the sulfuric acid may be used in an amount slightly higher (such as 2 to 10% higher) than the theoretical amount necessary to neutralize all of the alkali metal ions present. In addition, for production flexibility and to minimize the amount of water that is used that must be later removed, such as by distillation, aqueous solutions of sulfuric acid having a sulfuric acid concentration of 10% to 20% by percent, are commonly employed.

Polyether polyol and polyurethane foam producers are under increased pressure to reduce the presence of odor bodies. One such known odor body that sometimes gives rise to complaints is 2-Methyl-2-Pentenal ("2M2P"), $C_6H_{10}O$, which is known to form by acid reaction of allyl alcohol to propionaldehyde, which then condenses to 2M2P and water. The problem of 2M2P formation is particularly pronounced in production of long chain, low hydroxyl number polyether polyols, which are often used in the production of flexible polyurethane foams. These flexible polyurethane foams are often used in consumer applications, such as foam mattresses and vehicle seating, where the presence of odor bodies is particularly undesirable.

As a result, while the presence of up to 20 ppm of 2M2P in a polyether polyol has historically been acceptable, it would be desirable to provide a method of producing long chain, low hydroxyl number polyether polyols, that routinely have a 2M2P content of 10 ppm or less and which have little or no residual alkalinity from an alkaline catalyst while still maintaining a low acid number.

The present invention was made in view of the foregoing.

SUMMARY OF THE INVENTION

This specification is directed to methods for removing alkali metal ions from a polyol containing oxyalkylene units. The polyol is an alkali metal catalyzed alkoxylation reaction product of an alkylene oxide and an H-functional starter. The methods comprise neutralizing the alkali metal ions with an aqueous solution comprising water and sulfuric acid, in which: (i) the sulfuric acid is present in an amount of no more than 5% by weight, based on the total weight of the aqueous solution, and (ii) the sulfuric acid is used in an amount of 2% to 10% more than the theoretical amount necessary to neutralize all of the alkali metal ions present.

This specification is also directed to methods for producing polyols containing oxyalkylene units. The methods comprise: (a) adding an alkylene oxide onto an H-functional starter in the presence of an alkali metal catalyst to produce an alkaline-containing crude polyol; (b) neutralizing the alkaline-containing crude polyol by contacting an aqueous sulfuric acid solution with the alkaline-containing crude polyol; and (c) removing neutralization salts formed. In these methods, the aqueous sulfuric acid solution comprises sulfuric acid in an amount of no more than 5% by weight, based on the total weight of the aqueous sulfuric acid solution, and the sulfuric acid is used in an amount of 2% to 10% more than the theoretical amount necessary to neutralize all of the alkali metal ions present in the alkaline-containing crude polyol.

This specification also relates to polyols purified by such methods, as well as to polyurethanes, such as polyurethane foams, produced from such polyols.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, in certain embodiments, the present specification is directed to methods for removing alkali metal ions from polyols containing oxyalkylene units. Such removal of alkali metal ions may sometimes be referred to herein as purifying the polyol. Exemplary polyols are polyether polyols and polyether ester polyols.

The polyols subject to the methods of this present specification can be prepared in accordance with well-known procedures in which one or more alkylene oxides having from 2 to 10 carbon atoms, such as 2 to 6 carbon atoms, in the alkylene radical, and which are optionally substituted, are added to a H-functional starter molecule, which contains at least 2, such as 2 to 8, or, in some cases, 2 to 4 active hydrogen atoms, in the presence of an alkaline catalyst. The methods of the present specification are suitable for removing water and alkali metal ions from a wide range of polyols, in terms of their functionality, molecular weight and hydroxyl (OH) number.

In some implementations, however, the methods of this specification are particularly advantageous for use in connection with removing alkali metal ions from a "long chain" polyols, i.e., polyols that have a relatively low hydroxyl number. More specifically, in some implementations, the polyol has a hydroxyl number of no more than 56 mg KOH/gram, such as 25 to 56 mg KOH/gram, 25 to 40 mg KOH/gram, 25 to 36 mg KOH/gram, or, in some embodiments, 25 to 35 mg KOH/gram. As used herein, the term "hydroxyl number" refers to the number of reactive hydroxyl groups available for reaction, and is expressed as the number of milligrams of potassium hydroxide equivalent to the hydroxyl content of one gram of the polyol, and is measured according to ASTM D4274-16.

In addition, in some implementations, the polyol has a calculated number average molecular weight of at least 2800 gram/mole, such as 2800 to 10,000 gram/mole, 2800 to 8000 gram/mole, 2800 to 6000 gram/mole, in some cases, 3500 to 6000 gram/mole. The calculated number average molecular weights of the polyols described herein are calculated from the polyol's functionality and hydroxyl number according to the equation:

$$M_n = \frac{56100 * f}{OH\#}$$

in which $f$ is the functionality of the polyol (i.e., the number of hydroxyl groups per molecule), OH# is the hydroxyl number of the polyol and is equal to the mass in milligrams of potassium hydroxide (56.1 grams/mol) equivalent to the hydroxyl content in one gram of the polyol compound (mg KOH/g), and $M_n$ is the number average molecular weight of the polyol. The polyol functionality referred to herein is the theoretical average nominal functionality of the polyol, i.e., the functionality calculated based on the average number of hydroxyl groups per molecule of H-functional starter used to produce the polyol.

In addition, in some implementations, the polyol has an acid number of less than 0.5 mg KOH/g, such as less than 0.2 mg KOH/g, or, in some cases, less than 0.1 mg KOH/g. The acid number of the polyol can measured according to ASTM D7253-16.

As indicated, the polyols described in this specification are alkali metal catalyzed alkoxylation reaction products of an alkylene oxide and an H-functional starter. Alkylene oxides suitable for use in the methods of this specification include ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide and pinene oxide. In some implementations ethylene oxide (EO) and/or propylene oxide (PO) is used. More particularly, in some implementations, a ratio of EO and PO, based on the amount of alkylene oxide used, is between 5% by weight of EO/95% by weight of PO and 25% by weight of EO/80% by weight of PO. In addition to the alkylene oxides, it is also possible to use other comonomers which can be added individually or in a mixture with the alkylene oxides. The various alkylene oxides and any other comonomers can be metered in a mixture or in blocks. Ethylene oxide can be metered in, for example, in a mixture with other alkylene oxides or in blocks as a starting, middle or end block.

As used in this specification, "H-functional starter" refers to compounds having Zerewitinoff-active hydrogen atoms, often with functionalities of 1 to 8 and, in some implementations, a molar mass of 17 g/mol to 1200 g/mol, such as 32 to 1200 g/mol, or 62 to 1200 g/mol. Exemplary Zerewitinoff-active hydrogen atoms are —OH, —$NH_2$ (primary amines), —NH— (secondary amines), —SH, and —$CO_2H$.

Specific examples of hydroxy-functional starter compounds are methanol, ethanol, 1-propanol, 2-propanol and higher aliphatic monools, such as fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea, and Mannich bases.

Examples of starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane. In addition, starter compounds used may also be ring-opening products of cyclic carboxylic anhydrides and polyols. Examples are ring-opening products of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand. Ring-opening products of this kind can also be prepared in situ directly prior to the start of the alkylene oxide addition reaction in the polymerization reactor. In addition, it is also possible to use mono- or polyfunctional carboxylic acids directly as starter compounds. It is also possible to use mixtures of various starter compounds.

As indicated, an alkali metal ion-containing catalyst is used in the preparation of the polyols subject to the methods of this specification. Suitable catalysts are, for example, alkali metal hydrides, alkali metal carboxylates (for example those of monofunctional carboxylic acids), alkali metal hydroxides or alkali metal alkoxylates. Suitable alkali metal hydroxides include, for example sodium hydroxide, potassium hydroxide or cesium hydroxide, and suitable alkali metal alkoxylates include alkali metal alkoxylates of mono- or polyfunctional alcohols. As the latter, it is also possible to use previously prepared alkylene oxide addition products of starter compounds containing Zerewitinoff-active hydrogen atoms having alkoxylate contents of 0.05% to 50% in terms of equivalents ("polymeric alkoxylates"). The alkoxylate content of the catalyst is understood to mean the proportion of Zerewitinoff-active hydrogen atoms removed by deprotonation by a base AOH (A=alkali metal) of all the Zerewitinoff-active hydrogen atoms that were originally present in the alkylene oxide addition product of the catalyst. The amount of the polymeric alkali metal alkoxylate used is guided by the catalyst concentration desired for the amount of end product, expressed as the concentration of AOH.

In some implementations, the alkali metal ion-containing catalyst is used in an amount of 0.01 to 5 weight percent, 0.2 to 3 weight percent, or, in some cases, 0.1 to 1.0 weight percent, based on the total weight of polyol present.

The catalyst can be supplied to the starter compound, for example, as a pure substance (often solids) or as an aqueous solution. By means of a stripping step upstream of the alkylene oxide metering phase, water of dissolution and the water which arises, for example, through the reaction of the alkali metal hydroxides with the Zerewitinoff-active hydrogen atoms in the starter compounds are optionally removed. If, in the case of alkali metal hydroxide catalysis, aqueous solutions of starter compounds solid at room temperature are used, it is appropriate to perform only one stripping step, i.e., for example, before commencement of the actual alkylene oxide addition phase or, if desired, after interruption of an already running alkylene oxide addition reaction.

In some embodiments, the starter compound is reacted with the alkylene oxide(s) at a temperature of 70° C. to 170° C., such as 100° C. to 160° C. In order to achieve an optimal balance between high alkylene oxide conversion and low by-product formation in the case of use of sensitive starter compounds (for example sucrose), it may be desirable first to alkoxylate at low reaction temperatures (for example at 70 to 110° C.), and only when starter conversion is sufficient, for example as soon as at least 50% by weight of the starter compounds used have reacted with alkylene oxide at at least one Zerewitinoff-active hydrogen atom, to move to higher reaction temperatures (for example from 110 to 130° C.). Post-reactions can likewise be performed at higher temperatures (i.e. after raising the temperature to 100 to 170° C., such as 100 to 150° C.). In the case of long-chain polyols, it may be advisable, in the case of attainment of high equivalent molar masses and in the case of metered addition of blocks having high contents of oxypropylene units, for example at 500 Da or higher equivalent molar masses, to restrict the reaction temperature to values of 120° C., or 110° C. or less, in order to reduce side reactions of the propylene oxide, especially the rearrangement thereof to allyl alcohol, to a tolerable degree. Equivalent molar mass is understood to mean the number-average total molar mass of the material containing active hydrogen atoms divided by the number of active hydrogen atoms (functionality). The extent of these side reactions increases with the content of propylene oxide in the alkylene oxide mixture metered in; therefore, the restriction in the reaction temperature gains importance when the propylene oxide content in the alkylene oxide mixture metered in exceeds values of 30% by weight, especially when it exceeds values of 50% by weight or even 70% by weight. The metered addition of blocks having high contents of oxyethylene units or blocks consisting purely of oxyethylene units, and also post-reactions, can in turn be performed at higher temperatures (i.e. after raising the temperature to 120 to 170° C. or 120 to 150° C.).

In some cases it may be necessary or desirable to keep the temperature of the exothermic alkylene oxide addition reaction at the desired level by cooling. Suitable such cooling can generally be effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers.

Further information regarding suitable equipment and procedural aspects of producing polyols containing oxyalkylene units of the type involved in the methods of this specification can be found in U.S. Pat. No. 10,131,743 B2 at col. 8, line 22 to col. 10, line 9, the cited portion of which being incorporated by reference herein.

Prior to the neutralization of the alkali metal ions present in the polyol, the alkaline crude polyol can first be admixed with water under hydrolysis conditions, which results in regeneration of hydroxyl groups and the corresponding metal hydroxide, as a solution in the crude polyol, from the metal alkoxide groups of the crude polyol. In the context of the invention, the term "alkaline crude polyol" therefore also encompasses the embodiment of a "hydrolyzed alkaline crude polyol". Such a hydrolysis step is generally conducted at temperatures of 80 to 120° C., and customary amounts of water used here are from 0.5% to 25% by weight, such as 1% to 20% by weight, based on the amount of alkaline crude polyol. The hydrolysis step can be effected either by mixing in the neutralization tank or by inline blending of the two components, water and crude polyol, for example during the transfer of the alkaline crude polyol from the reactor to the neutralization tank.

According to the methods of this specification, purification of the polyol comprises neutralizing alkali metal ions present in the polyol with an aqueous solution comprising water and sulfuric acid (sometimes referred to as an "aqueous sulfuric acid solution"). More specifically, a critical aspect of the methods of this specification is that the aqueous sulfuric acid solution employed in the methods of this specification comprises sulfuric acid in an amount of no more than 5% by weight, such as 2 to 5% by weight, 2% to 4.6% by weight 2.0% to 4.0% by weight, 2.0% to 3.5% by weight, or, in some cases 2.0% to 3.0% by weight, based on the total weight of the aqueous solution. In addition, according to the method of this specification, the sulfuric acid is used in an amount of 2% to 10% more, in some cases 5% to 10% more, than the theoretical amount necessary to neutralize all of the alkali metal ions present. In some implementations, the neutralization with such aqueous sulfuric acid solution is conducted at temperatures of 20° C. to 150° C., such as 60° C. to 140° C., or, in some cases, 80° C. to 130° C.

In fact, it was discovered, surprisingly, that by reducing the concentration of sulfuric acid in the aqueous sulfuric acid solution used in the foregoing neutralization to within the amounts described above, it was possible to significantly and reliably reduce the amount of 2M2P present in the purified polyol, without changing the total amount of sulfuric acid employed in the neutralization. More particularly, in some implementations, the amount of 2M2P in the resulting refined polyol is no more than 10 ppm, in some cases less than 10 ppm, such as less than 5 ppm. Moreover, in certain embodiments, the purified polyol has an alkali metal ion content of no more than 100 ppm, such as no more than 10 ppm, no more than 5 ppm, or, in some cases, no more than 1 ppm. Also, in some implementations, the polyol has an APHA color number of no more than 150 or, in some cases, no more than 100 or no more than 50.

After contacting the alkaline crude polyol with the sulfuric acid, the mixing of these components can be improved by stirring and/or pumped circulation over a certain period of time. It is often desirable that mixing be conducted in such a way that formation and obtaining of salt particles in sufficient size and suitable morphology for the downstream salt removal step is assured. Good indicators for a sufficient mixing time are a stable pH and/or a stable acid number. The temperature chosen in the course of mixing may be chosen within the same range as the neutralization temperature.

After the crude polyol neutralization has ended, it may be desirable to add an antioxidant. Many antioxidants, especially those having phenolic hydroxyl groups, impart an unwanted color to alkaline crude polyols; therefore, they are usually added only after neutralization.

In some implementations, the removal of salts via filtration or sedimentation is preceded by a distillation step to remove water. In some implementations, water is removed first under standard pressure and later under reduced pressure until pressure and temperature values where the residual water content in the polyol is within the specified limits have been attained, for example with the combination of a pressure of 5 mbar and a temperature of 120° C. Such a distillation can also be interrupted for conduction of the filtration step, for example prior to entry into the reduced pressure phase. In this procedure, the fine distillation is conducted only after the filtration. The small amounts of water that remain after the standard pressure distillation are generally entirely soluble in the polyols, and so the salt at this time has already crystallized out virtually completely. Sometimes, quantitative salt formation is even possible virtually completely without removal of the water, for example when polyols having low equivalent molar masses are being worked up, these being entirely miscible with large amounts of water. In the workup process, it is also possible to promote salt removal via filtration through adsorbents. It may be advantageous to add such adsorbents prior to or during the removal of water, since they may be particularly effective when the polyol still has a certain water content. Adsorbents suitable for this purpose are, for example, sheet silicates (bentonite, attapulgite), diatomaceous earth (Celite) and synthetic magnesium silicate, such as AMBOSOL® or BriteSorb®.

In some implementations, the removal of the salt particles is effected via filtration and can be accomplished with the aid of a wide variety of different filtration apparatuses. On the industrial scale, what are called precoat filtrations are frequently conducted, in which the filtercake itself acts as the effective filter layer. In that case, the polyol containing salt particles is generally at first guided in circulation through the filtration apparatus until a filter cake having sufficient depth filter action has formed ("cloudy run time"), before the product, which then filters through as a clear liquid, is transferred into the final receiver. To promote the filtercake formation, a small amount of a filtration aid, for example cellulose fibers, can be added to the circulating polyol containing salt particles. Performance of such filtrations is frequently accomplished using candle filters, plate pressure filters or plate filters. Filtration operations can be optimized by the adjustment of process parameters, for example a sufficiently high pressure differential across the filter layer and a suitable viscosity controllable via the temperature. It will be appreciated that the removal of the neutralization salts formed is not restricted to the option of filtration, but can be undertaken by other methods, such as particle sedimentation, centrifugation or the like.

For salt-free and stabilized polyols which have been worked up to completion too, handling and storage with exclusion of oxygen is often recommended. Inert gases suitable for this purpose are, for example, noble gases, nitrogen or carbon dioxide. The prevention of ingress of oxygen very substantially prevents product discoloration; especially at elevated temperatures, which are generally utilized to facilitate the handling of the finished products through lowering of the product viscosity. Furthermore, under an inert gas atmosphere, a much lower level of peroxide groups also arises, these contributing to cleavage of polyether chains to form further low molecular weight oxidative degradation products.

The polyols purified by the methods of the present specification may be used in a variety of applications. For example, such polyols may be reacted with one or more isocyanates to provide polyurethane products including, but not limited to, coatings, adhesives, sealants, elastomers, foams, including flexible foams, and the like. Suitable organic polyisocyanates for forming such polyurethanes include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula:

$$Q(NCO)_n$$

in which n is a number from 2-5, such as 2-3, and Q is an aliphatic hydrocarbon group; a cycloaliphatic hydrocarbon group; an aralphatic hydrocarbon group; or an aromatic hydrocarbon group.

Various aspects of the subject matter described in this specification are set out in the following numbered clauses:

Clause 1. A method for removing alkali metal ions from a polyol containing oxyalkylene units and that is an alkali metal catalyzed alkoxylation reaction product of an alkylene oxide and an H-functional starter, comprising neutralizing the alkali metal ions with an aqueous solution comprising water and sulfuric acid, in which: (i) the sulfuric acid is present in an amount of no more than 5% by weight, based on the total weight of the aqueous solution, and (ii) the sulfuric acid is used in an amount of 2% to 10% more than the theoretical amount necessary to neutralize all of the alkali metal ions present.

Clause 2. The method of clause 1, wherein the polyol has a hydroxyl number of no more than 56 mg KOH/gram, such as 25 to 56 mg KOH/gram, 25 to 40 mg KOH/gram, 25 to 36 mg KOH/gram, or 25 to 35 mg KOH/gram, measured according to ASTM D4274-16.

Clause 3. The method of one of clause 1 or clause 2, wherein the polyol has a calculated number average molecular weight of at least 2800 gram/mole, such as 2800 to 10,000 gram mole, 2800 to 8000 gram/mole, 2800 to 6000 gram/mole, or 3500 to 6000 gram/mole.

Clause 4. The method of one of clause 1 to clause 3, wherein the polyol has an acid number of less than 0.5 mg KOH/g, such as less than 0.2 mg KOH/g, or less than 0.1 mg KOH/g, measured according to ASTM D7253-16.

Clause 5. The method of one of clause 1 to clause 4, wherein the alkylene oxide comprises ethylene oxide (EO) and/or propylene oxide (PO), wherein a ratio of EO and PO, based on the amount of alkylene oxide used, is between 5% by weight of EO/95% by weight of PO and 25% by weight of EO/80% by weight of PO.

Clause 6. The method of one of clause 1 to clause 5, wherein the H-functional starter has a functionality of 1 to 8 and a molar mass of 17 g/mol to 1200 g/mol, such as 32 to 1200 g/mol, or 62 to 1200 g/mol and comprises —OH, —NH$_2$ (primary amines), —NH— (secondary amines), —SH, and/or —CO$_2$H groups.

Clause 7. The method of clause 6, wherein the H-functional starter comprises methanol, ethanol, 1-propanol, 2-propanol, a fatty alcohol, phenol, an alkyl-substituted phenol, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, a methylol-containing condensate of formaldehyde and phenol or melamine or urea, a Mannich base, ammonia, ethanolamine, diethanolamine, isopropanolamine, diisopropanolamine, ethylenediamine, hexamethylenediamine, aniline, an isomer of toluidine, an isomer of diaminotoluene, an isomer of diaminodiphenylmethane, a polycyclic product obtained in the condensation of aniline with formaldehyde to give diaminodiphenylmethane, and/or a ring-opening product of a cyclic carboxylic anhydride and a polyol, such as a ring-opening product of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand.

Clause 8. The method of one of clause 1 to clause 7, wherein the alkali metal ion-containing catalyst comprises sodium hydroxide, potassium hydroxide and/or cesium hydroxide.

Clause 9. The method of one of clause 1 to clause 8, wherein prior to the neutralizing, the polyol is admixed with water under hydrolysis conditions at a temperature of 80 to 120° C., in which water is used in an amount of 0.5% to 25% by weight, such as 1% to 20% by weight, based on the amount of alkaline crude polyol.

Clause 10. The method of one of clause 1 to clause 9, wherein the sulfuric acid is present in an amount of 2 to 5% by weight, 2% to 4.6% by weight 2.0% to 4.0% by weight, 2.0% to 3.5% by weight, or 2.0% to 3.0% by weight, based on the total weight of the aqueous solution.

Clause 11. The method of one of clause 1 to clause 10, wherein the sulfuric acid is used in an amount of 5% to 10% more than the theoretical amount necessary to neutralize all of the alkali metal ions present.

Clause 12. The method of one of clause 1 to clause 11, wherein the neutralization is conducted at a temperature of 20° C. to 150° C., 60° C. to 140° C., or 80° C. to 130° C.

Clause 13. The method of one of clause 1 to clause 12, wherein the polyol, after the neutralizing, has a content of 2M2P of no more than 10 ppm, less than 10 ppm, or less than 5 ppm.

Clause 14. The method of one of clause 1 to clause 13, wherein the polyol, after the neutralizing, has an alkali metal ion content of no more than 100 ppm, no more than 10 ppm, no more than 5 ppm, or no more than 1 ppm.

Clause 15. The method of one of clause 1 to clause 14, wherein the polyol, after the neutralizing, has an APHA color number of no more than 150, no more than 100 or no more than 50.

Clause 16. A method for producing a polyol containing oxyalkylene units, comprising: (a) adding an alkylene oxide onto an H-functional starter in the presence of an alkali metal catalyst to produce an alkaline-containing crude polyol; (b) neutralizing the alkaline-containing crude polyol by contacting an aqueous sulfuric acid solution with the alkaline-containing crude polyol; and (c) removing neutralization salts formed, wherein (i) the aqueous sulfuric acid solution comprises sulfuric acid in an amount of no more than 5% by weight, based on the total weight of the aqueous sulfuric acid solution, and (ii) the sulfuric acid is used in an amount of 2% to 10% more than the theoretical amount necessary to neutralize all of the alkali metal ions present in the alkaline-containing crude polyol.

Clause 17. The method of clause 16, wherein the polyol has a hydroxyl number of no more than 56 mg KOH/gram, such as 25 to 56 mg KOH/gram, 25 to 40 mg KOH/gram, 25 to 36 mg KOH/gram, or 25 to 35 mg KOH/gram, measured according to ASTM D4274-16.

Clause 18. The method of one of clause 16 or clause 17, wherein the polyol has a calculated number average molecular weight of at least 2800 gram/mole, such as 2800 to 10,000 gram mole, 2800 to 8000 gram/mole, 2800 to 6000 gram/mole, or 3500 to 6000 gram/mole.

Clause 19. The method of one of clause 16 to clause 18, wherein the polyol has an acid number of less than 0.5 mg KOH/g, such as less than 0.2 mg KOH/g, or, in some cases, less than 0.1 mg KOH/g, measured according to ASTM D7253-16.

Clause 20. The method of one of clause 16 to clause 19, wherein the alkylene oxide comprises ethylene oxide (EO) and/or propylene oxide (PO), wherein a ratio of EO and PO, based on the amount of alkylene oxide used, is between 5% by weight of EO/95% by weight of PO and 25% by weight of EO/80% by weight of PO.

Clause 21. The method of one of clause 16 to clause 20, wherein the H-functional starter has a functionality of 1 to 8 and a molar mass of 17 g/mol to 1200 g/mol, such as 32 to 1200 g/mol, or 62 to 1200 g/mol and comprises —OH, —NH$_2$ (primary amines), —NH— (secondary amines), —SH, and/or —CO$_2$H groups.

Clause 22. The method of clause 21, wherein the H-functional starter comprises methanol, ethanol, 1-propanol, 2-propanol, a fatty alcohol, phenol, an alkyl-substituted phenol, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, a methylol-containing condensate of formaldehyde and phenol or melamine or urea, a Mannich base, ammonia, ethanolamine, diethanolamine, isopropanolamine, diisopropanolamine, ethylenediamine, hexamethylenediamine, aniline, an isomer of toluidine, an isomer of diaminotoluene, an isomer of diaminodiphenylmethane, a polycyclic product obtained in the condensation of aniline with formaldehyde to give diaminodiphenylmethane, and/or a ring-opening product of a cyclic carboxylic anhydride and a polyol, such as a ring-opening product of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand.

Clause 23. The method of one of clause 16 to clause 23, wherein the alkali metal ion-containing catalyst comprises sodium hydroxide, potassium hydroxide and/or cesium hydroxide.

Clause 24. The method of one of clause 16 to clause 24, wherein prior to the neutralizing, the polyol is admixed with water under hydrolysis conditions at a temperature of 80 to 120° C., in which water is used in an amount of 0.5% to 25% by weight, such as 1% to 20% by weight, based on the amount of alkaline-containing crude polyol.

Clause 25. The method of one of clause 16 to clause 24, wherein the sulfuric acid is present in an amount of 2 to 5% by weight, 2% to 4.6% by weight 2.0% to 4.0% by weight, 2.0% to 3.5% by weight, or 2.0% to 3.0% by weight, based on the total weight of the aqueous solution.

Clause 26. The method of one of clause 16 to clause 25, wherein the sulfuric acid is used in an amount of 5% to 10% more than the theoretical amount necessary to neutralize all of the alkali metal ions present.

Clause 27. The method of one of clause 16 to clause 26, wherein the neutralization is conducted at a temperature of 20° C. to 150° C., 60° C. to 140° C., or 80° C. to 130° C.

Clause 28. The method of one of clause 16 to clause 27, wherein the polyol, after the neutralizing, has a content of 2M2P of no more than 10 ppm, less than 10 ppm, or less than 5 ppm.

Clause 29. The method of one of clause 16 to clause 28, wherein the polyol, after the neutralizing, has an alkali metal ion content of no more than 100 ppm, no more than 10 ppm, no more than 5 ppm, or no more than 1 ppm.

Clause 30. The method of one of clause 16 to clause 29, wherein the polyol, after the neutralizing, has an APHA color number of no more than 150, no more than 100 or no more than 50.

Clause 31. The method of one of clause 16 to clause 30, wherein after the neutralizing, an antioxidant is added to the polyol, such as where the antioxidant comprises phenolic hydroxyl groups.

Clause 32. The method of one of clause 16 to clause 31, further comprises removing water from the polyol by distillation step prior to removing neutralization salts, such as where water is removed first under standard pressure and later under reduced pressure, such as with the combination of a pressure of 5 mbar and a temperature of 120° C.

Clause 33. The method of one of clause 16 to clause 32, wherein the removing neutralization salts comprises filtration, such as by utilizing a candle filter, a plate pressure filter or a plate filter, particle sedimentation, or centrifugation.

The non-limiting and non-exhaustive examples that follow are intended to further describe various non-limiting and non-exhaustive embodiments without restricting the scope of the embodiments described in this specification.

EXAMPLES

Example 1 (Inventive)

220 kg of a crude glycerin-based polyether polyol with a nominal hydroxyl number of 28 mg KOH/g and a potassium concentration of 0.3 wt % on a KOH basis was charged to an agitated vessel equipped with a radial flow impeller at the bottom and a second stage axial flow impeller above it. The crude polyol was heated to 90° C. and then 12.19 kg of a 5 wt % aqueous mixture of sulfuric acid was added to the vessel through a port at the top of the vessel. This was equivalent to approximately 106% of the theoretical amount of acid necessary to neutralize the potassium hydroxide catalyst. The acid solution was mixed into the crude polyol for 1 hour after acid addition. The vessel was then heated to 115° C. Once this temperature was reached the mixture was allowed to boil (atmospheric distillation) through an open vent to remove the bulk of the water from the mixture. After the pressure dropped below 5 psig, the vessel was placed under vacuum to continue the water removal. During the vacuum distillation, the vessel temperature was slowly increased to 130° C. over approximately 1 hour. The vacuum distillation continued until the water concentration was less than 0.10 wt %. At this point, potassium sulfate crystals had formed and precipitated in the vessel. The potassium sulfate crystals were suspended in the liquid by the agitator. This suspension was pumped through a filter to remove the crystals and collect the purified polyether product. The volatile content of the purified polyol was then measured by headspace GC-MS and 0.96 ppm of 2M2P was found in the sample.

Example 2 (Inventive)

A crude polyether polyol was purified as described in Example 1. The volatile content of the purified polyol was measured by headspace GC-MS and 3.81 ppm of 2M2P was found in the sample.

Example 3 (Inventive)

A crude polyether polyol was purified as described in Example 1. The volatile content of the purified polyol was measured by headspace GC-MS and 10.84 ppm of 2M2P was found in the sample.

Example 4 (Inventive)

A crude polyether polyol was purified as described in Example 1. The volatile content of the purified polyol was measured by headspace GC-MS and 5.42 ppm 2-Methyl-2-Pentenal (2M2P) was found in the sample.

Example 5 (Inventive)

A crude polyether polyol was purified as described in Example 1. The volatile content of the purified polyol was measured by headspace GC-MS and 2.44 ppm of 2M2P was found in the sample.

Example 6 (Comparative)

A crude polyol of the type described in Example 1 was added to the same agitated vessel described in Example 1 and heated to 90° C. Next, 19.4 kg water was added to the crude polyol and the solution was mixed for 15 minutes. Then 5.6 kg of an 11 wt % aqueous mixture of sulfuric acid was added to the vessel through a port at the top of the vessel. This was equivalent to approximately 106% of the theoretical amount of acid necessary to neutralize the potassium hydroxide catalyst. Thereafter, the procedure described in Example 1 was followed. The volatile content of the purified polyol was then measured by headspace GC-MS and 93.1 ppm of 2M2P was found in the sample.

Example 7 (Comparative)

A crude polyol of the type described in Example 1 was added to the same agitated vessel and heated to 90° C. Next, 22.0 kg water was added to the crude polyol and the solution was mixed for 15 minutes. Then 3.1 kg of a 20 wt % aqueous mixture of sulfuric acid was added to the vessel through a port at the top of the vessel. This was equivalent to approximately 106% of the theoretical amount of acid necessary to neutralize the potassium hydroxide catalyst. Thereafter, the procedure described in Example 1 was followed. The volatile content of the purified polyol was then measured by headspace GC-MS and 161 ppm of 2M2P was found in the sample.

Example 8 (Inventive)

220 kg of a crude polyether polyol based on a mixture of sorbitol and glycerin, with a nominal hydroxyl number of 31.5 mg KOH/g, and a potassium concentration of 0.3 wt % on a KOH basis was charged to the same agitated vessel from Example 1. The crude polyol was heated to 90° C. and then 12.19 kg of a 5 wt % aqueous mixture of sulfuric acid was added to the vessel through a port at the top of the vessel. This was equivalent to approximately 106% of the theoretical amount of acid necessary to neutralize the potassium hydroxide catalyst. The acid solution was mixed into the crude polyol for 1 hour after acid addition. The vessel was then heated to 115° C. Once this temperature has been reached the mixture was allowed to boil (atmospheric distillation) through an open vent to remove the bulk of the water from the mixture. After the pressure dropped below 5 psig, the vessel was placed under vacuum to continue the water removal. During the vacuum distillation, the vessel temperature was slowly increased to 130° C. over approximately 1 hour. The vacuum distillation continued until the water concentration is less than 0.10 wt %. At this point, potassium sulfate crystals had formed and precipitated in the vessel. The potassium sulfate crystals were suspended in the liquid by the agitator. This suspension was pumped through a filter to remove the crystals and collect the purified polyether product. The volatile content of the purified polyol was then measured by headspace GC-MS and 1.83 ppm of 2M2P was found in the sample.

Example 9 (Comparative)

220 kg of a crude polyether polyol of the type described in Example 9 was charged to the same agitated vessel and heated to 90° C. as described in Example 9. Next, 22.0 kg water was added to the crude polyol and the solution was mixed for 15 minutes. Then 3.1 kg of a 20 wt % aqueous mixture of sulfuric acid was added to the vessel through a port at the top of the vessel. This was equivalent to approximately 106% of the theoretical amount of acid necessary to neutralize the potassium hydroxide catalyst. Thereafter, the procedure described in Example 9 was followed. The volatile content of the purified polyol was then measured by headspace GC-MS and 277.0 ppm of 2M2P was found in the sample.

Example 10 (Comparative)

A crude polyether polyol was purified as described in Example 7, except that the water pre-charge was 4.3 kg instead of 22 kg. The volatile content of the purified polyol was then measured by headspace GC-MS and 342 ppm of 2M2P was found in the sample.

Example 11 (Comparative)

A crude polyether polyol was purified as described in Example 9. The volatile content of the purified polyol was then measured by headspace GC-MS and 215 ppm of 2M2P was found in the sample.

Example 12 (Inventive)

20 kg of a crude polyether polyol of the type described in Example 1 was charged to a small agitated vessel equipped with a gate impeller. The crude polyol was heated to 110° C. and then 2.1 kg of a 2.7 wt % aqueous mixture of sulfuric acid was added to the vessel through a port at the top of the vessel. This was equivalent to approximately 106% of the theoretical amount of acid necessary to neutralize the potassium hydroxide catalyst. The acid solution was mixed into the crude polyol for 1 hour after acid addition. The vessel was then heated to 115° C. Once this temperature was reached the mixture was allowed to boil through an open vent to remove the bulk of the water from the mixture. After the pressure dropped below 5 psig, the vessel was placed under vacuum to continue the water removal. During the vacuum distillation, the vessel temperature was slowly increased to 130° C. over approximately 1 hour. The vacuum distillation continued until the water concentration was less than 0.10 wt %. At this point, potassium sulfate crystals had formed and precipitated in the vessel. The potassium sulfate crystals were suspended in the liquid by the agitator. This suspension was pumped through a filter to remove the crystals and collect the purified polyether product. The volatile content of the purified polyol was then measured by headspace GC-MS and 1.68 ppm of 2M2P was found in the sample.

Examples 13-41

For each of Examples 13-41, the procedure of Example 8 was followed, except that the concentration of the aqueous mixture of sulfuric acid varied as indicated in Table 1. Each purified polyol was then measured by headspace GC-MS for 2M2P content. Results are set forth in Table 1.

| Example | $H_2SO_4$ concentration | 2M2P content (ppm) |
| --- | --- | --- |
| 13 (comparative) | 8.7% | 39.3 |
| 14 (inventive) | 4.1% | 6.78 |
| 15 (inventive) | 2.6% | 8.71 |
| 16 (inventive) | 2.7% | 3.3 |
| 17 (comparative) | 8.7% | 24.4 |
| 18 (comparative) | 9.1% | 7.78 |
| 19 (comparative) | 9.1% | 17.8 |
| 20 (inventive) | 2.6% | 9.74 |
| 21 (inventive) | 2.7% | 1.91 |
| 22 (inventive) | 2.7% | 2.69 |
| 23 (comparative) | 9.1% | 7.02 |
| 24 (comparative) | 9.1% | 24.5 |
| 25 (comparative) | 9.1% | 4.72 |
| 26 (comparative) | 9.1% | 0.0001 |
| 27 (comparative) | 8.7% | 39.5 |
| 28 (comparative) | 9.1% | 0.0001 |
| 29 (inventive) | 2.5% | 2.69 |
| 30 (inventive) | 2.7% | 3.93 |
| 31 (comparative) | 8.9% | 14.11 |
| 32 (inventive) | 2.7% | 0.0001 |

-continued

| Example | $H_2SO_4$ concentration | 2M2P content (ppm) |
| --- | --- | --- |
| 33 (comparative) | 8.9% | 9.94 |
| 34 (inventive) | 2.7% | 2.96 |
| 35 (inventive) | 2.8% | 1.23 |
| 36 (comparative) | 9.4% | 6.67 |
| 37 (inventive) | 2.8% | 0.87 |
| 38 (inventive) | 2.8% | 3.81 |
| 39 (inventive) | 2.8% | 6.48 |
| 40 (inventive) | 4.6% | 8.07 |
| 41 (inventive) | 2.7% | 0.95 |

Figure 1:
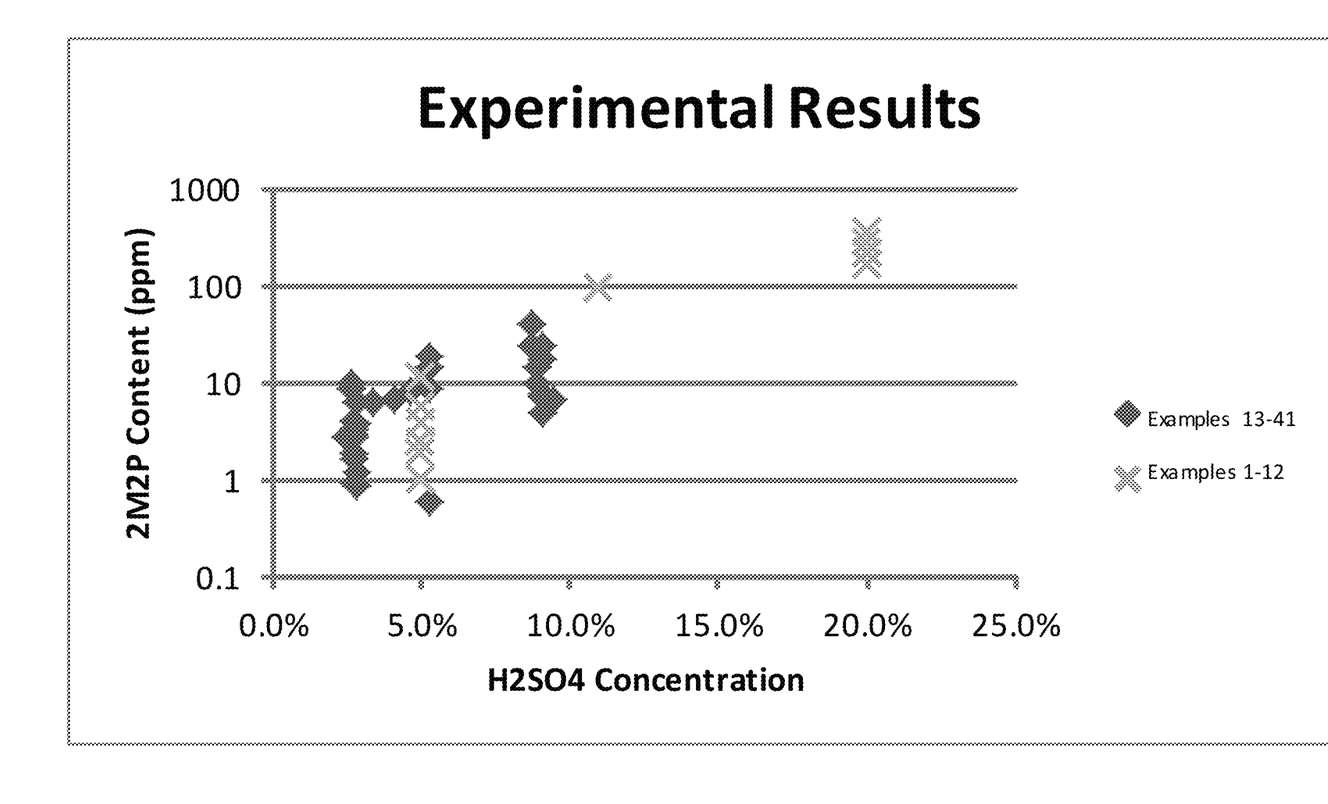
FIG. 1 graphically depicts the experimental results (2M2P content vs. $H_2SO_4$ concentration).

The results experimental results are plotted graphically in FIG. 1.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A method for removing alkali metal ions from a polyol containing oxyalkylene units and that is an alkali metal catalyzed alkoxylation reaction product of an alkylene oxide and an H-functional starter, comprising neutralizing the alkali metal ions with an aqueous solution comprising water and sulfuric acid, in which:
   (i) the sulfuric acid is present in an amount of no more than 5% by weight, based on the total weight of the aqueous solution, and
   (ii) the sulfuric acid is used in an amount of 2% to 10% more than the theoretical amount necessary to neutralize all of the alkali metal ions present,
   wherein the polyol after neutralization has a hydroxyl number of no more than 56 mg KOH/gram, measured according to ASTM D4274-16.

2. The method of claim 1, wherein the polyol has a hydroxyl number of 25 to 35 mg KOH/gram, measured according to ASTM D4274-16.

3. The method of claim 1, wherein the sulfuric acid is present in an amount of 2.0% to 4.6% by weight, based on the total weight of the aqueous solution.

4. The method of claim 1, wherein the sulfuric acid is present in an amount of 2.0% to 4.0% by weight, based on the total weight of the aqueous solution.

5. The method of claim 1, wherein the sulfuric acid is present in an amount of 2.0% to 3.5% by weight, based on the total weight of the aqueous solution.

6. The method of claim 1, wherein the sulfuric acid is present in an amount of 2.0% to 3.0% by weight, based on the total weight of the aqueous solution.

7. The method of claim 1, wherein the sulfuric acid is used in an amount of 5% to 10% more than the theoretical amount necessary to neutralize all of the alkali metal ions present.

8. The method of claim 1, wherein the polyol, after the neutralizing, has a content of 2-Methyl-2-Pentenal (2M2P) of no more than 10 ppm.

9. The method of claim 1, wherein the polyol, after the neutralizing, has a content of 2M2P of less than 5 ppm.

* * * * *